July 8, 1969  N. A. ROUGHTON  3,454,766
METHOD AND APPARATUS FOR VIBRATION ANALYSIS
UTILIZING THE MOSSBAUER EFFECT
Filed March 11, 1966
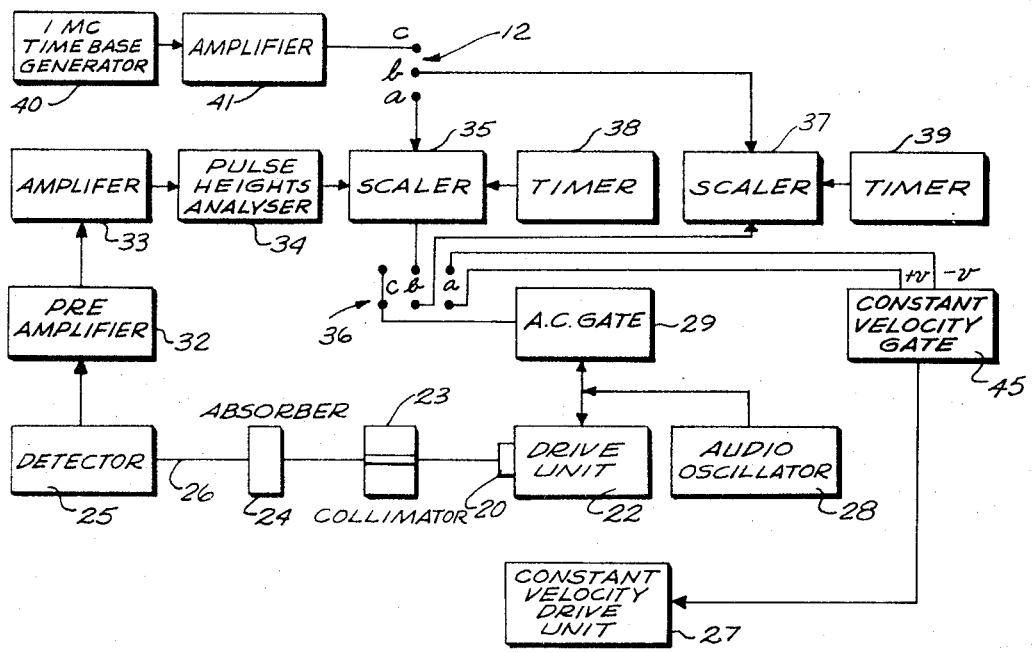
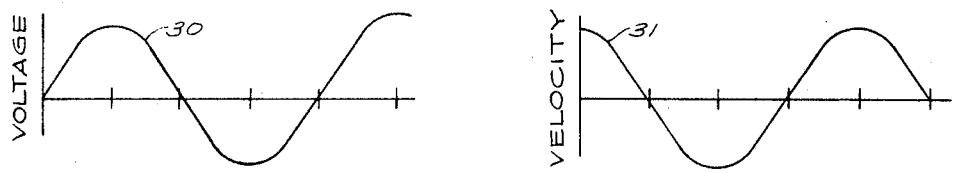
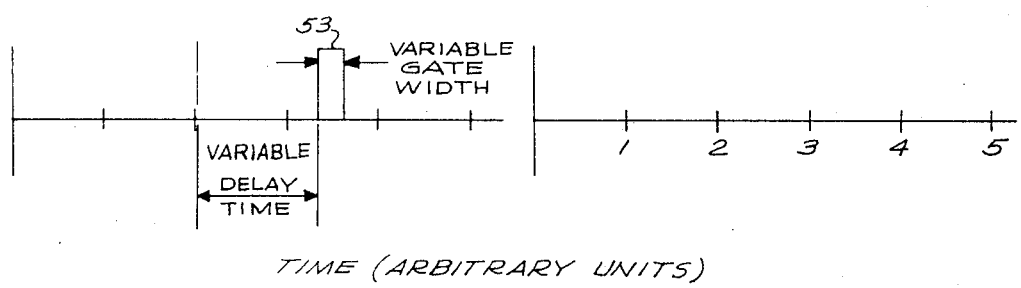
TIME (ARBITRARY UNITS)
INVENTOR.
NORBERT A. ROUGHTON
BY
ATTORNEY

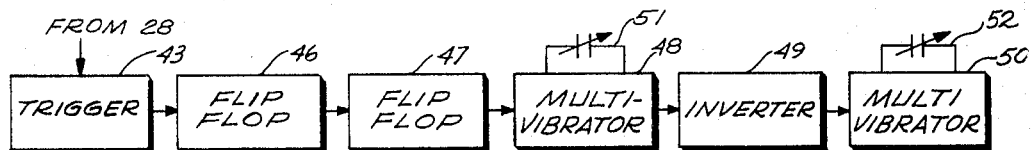
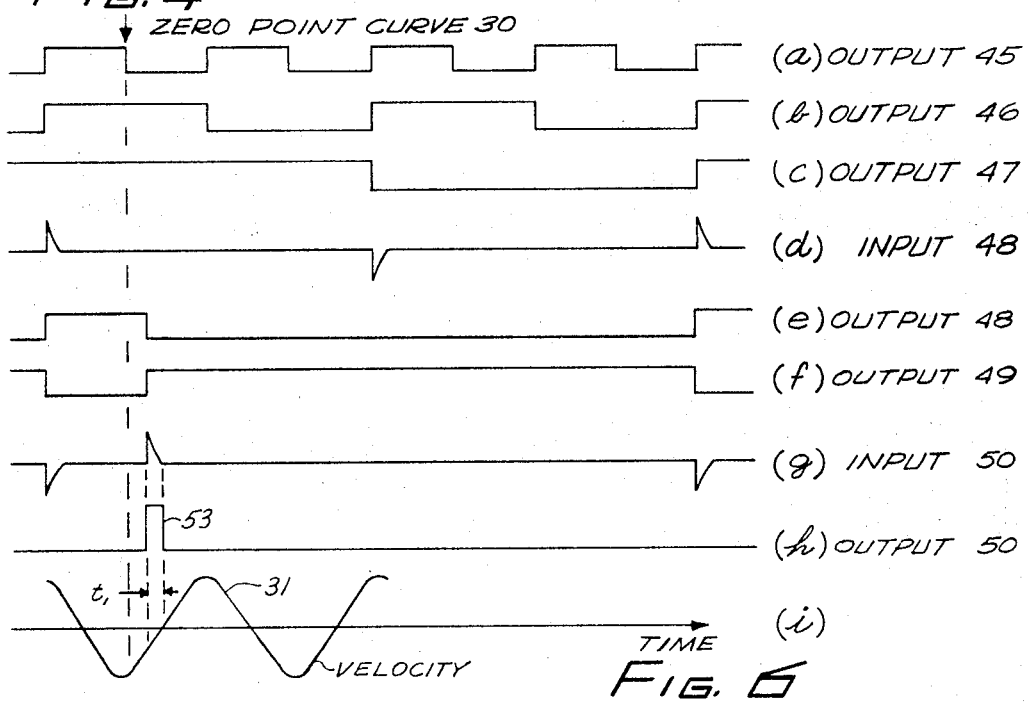
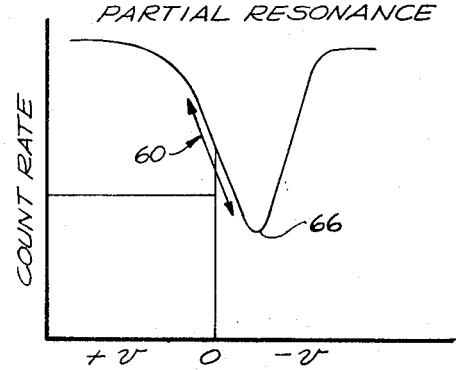
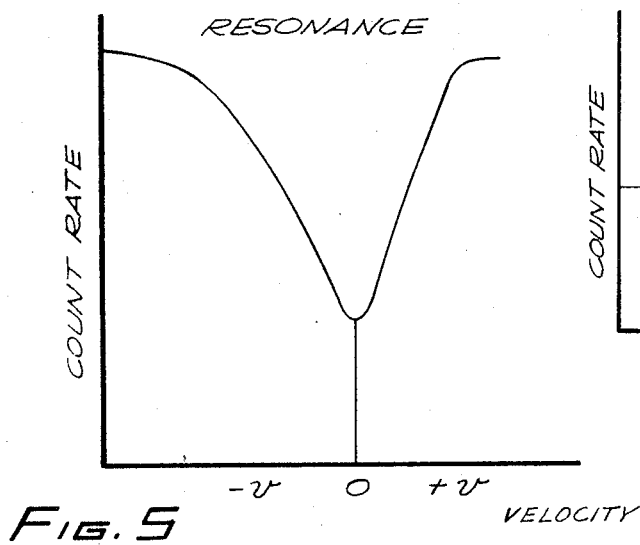

FIG. 7
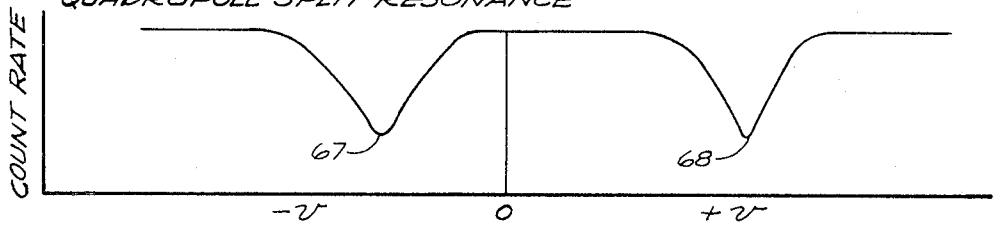
QUADRUPOLE SPLIT RESONANCE
FIG. 8
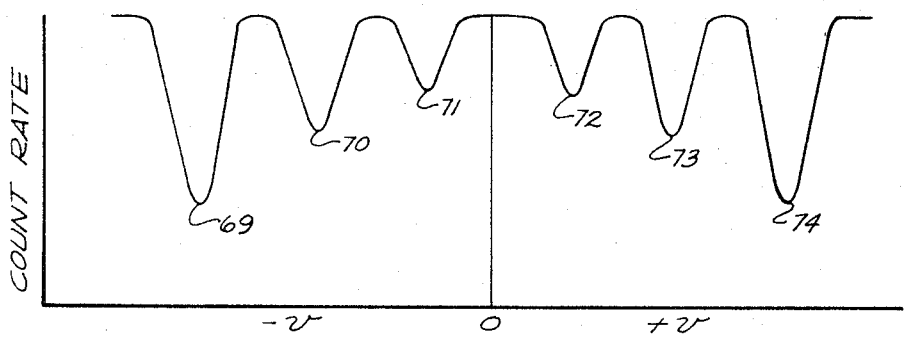
NUCLEAR ZEEMAN EFFECT
FIG. 9
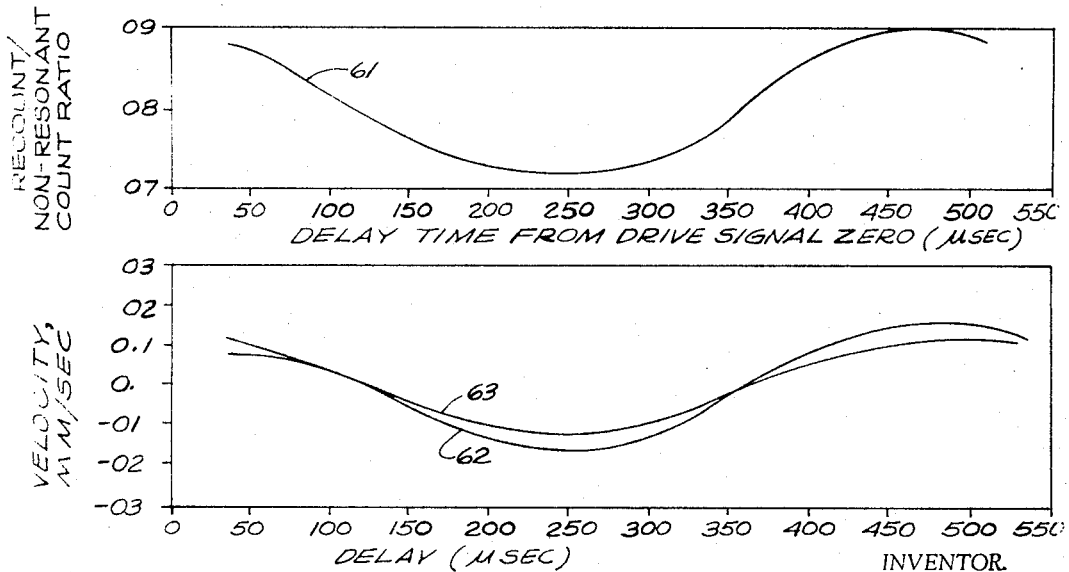
FIG. 10

INVENTOR.
NORBERT A. ROUGHTON

BY
Thomas S. MacDonald
ATTORNEY

United States Patent Office 3,454,766
Patented July 8, 1969

3,454,766
METHOD AND APPARATUS FOR VIBRATION ANALYSIS UTILIZING THE MOSSBAUER EFFECT
Norbert A. Roughton, St. Louis, Mo., assignor to North American Rockwell Corporation, a corporation of Delaware
Filed Mar. 11, 1966, Ser. No. 533,650
Int. Cl. G01j 1/16
U.S. Cl. 250—83.3                    13 Claims

ABSTRACT OF THE DISCLOSURE

An apparatus and method for analyzing or calibrating the vibratory motion characteristics of a transducer utilizing the Mossbauer effect in which the energy and density at preselected times are sampled with reference to the alternating motion of a Mossbauer gamma ray source attached to the transducer.

---

The present invention is directed to a method and apparatus for the measurement of very small vibration amplitudes utilizing the Mossbauer effect and more particularly to a method and apparatus for sampling the energy density at a preselected time with reference to the alternating motion of a Mossbauer gamma-ray source.

The present invention utilizes the phenomenon, known as the Mossbauer effect, based upon recoil-free nuclear gamma-ray resonance absorption. In this phenomenon a gamma quantum emitted from the nucleus of a source material in transition from an excited energy state to a stable ground state performs the inverse process of resonance absorption in an identical nucleus of the absorber material. Since the nuclei are prevented from picking up any recoil energy in the emission and absorption processes, the nuclei emitting and absorbing gamma-rays can easily be brought into resonance.

The recoil-free condition is accomplished by utilizing nuclei held in a rigid structural configuration such as is found in the bonding of crystal lattices, metals and organic molecules. The detection of the nuclear recoilless gamma absorption is achieved by measuring the absorption or transmission of gamma-rays by target nuclei as a function of the velocity with which the emitting source is moved relative to the absorbing target. At zero relative velocity, and assuming the source and absorber are in the same environment, the emission and absorption of recoilless gamma-rays are in perfect resonance and a maximum absorption or minimum transmission of gamma-rays occurs. With Doppler velocities, applied to the source, for example, minute differences in the energy levels of a variety of target materials may be detected and transmission spectra obtained. If the relative motion source and absorber is sinusoidal the instantaneous energy density of the emitted gamma-rays is also sinusoidal. The present invention utilizes this effect in vibration measuring and transducer calibrating.

It is therefore, the primary object of the present invention to provide a method and apparatus for analyzing and measuring the vibrational characteristics of transducers and other vibrating structures utilizing the Mossbauer effect.

It is another object of the present invention to provide a method and apparatus utilizing the Mossbauer effect for analyzing the vibration characteristics of a transducer.

It is a further object of the present invention to provide a method and apparatus utilizing the Mossbauer effect for calibrating vibrating transducers.

It is a further object of the present invention to provide a method and apparatus for the measurement of vibration amplitudes of at least about 1 A. unit utilizing the Mossbauer effect.

These and other objects of the present invention will become more apparent from the following detailed description of various embodiments of the present invention taken together with the drawings, hereby made a part thereof, in which:

FIG. 1 is a schematic diagram of the apparatus of the present invention;

FIG. 2 is a series of graphs showing the operating sequence in simplified form of the apparatus of FIG. 1;

FIG. 3 is a schematic diagram of the A.C. gate circuit of FIG. 1;

FIG. 4 is a graph showing the actual timing sequence of the circuit of FIG. 3;

FIGS. 5–8 are graphs of count rate as a function of velocity for various Mossbauer materials;

FIG. 9 is a graph of the relative count ratio as a function of delay time;

FIG. 10 is a graph of velocity as a function of delay time;

Figure 13:
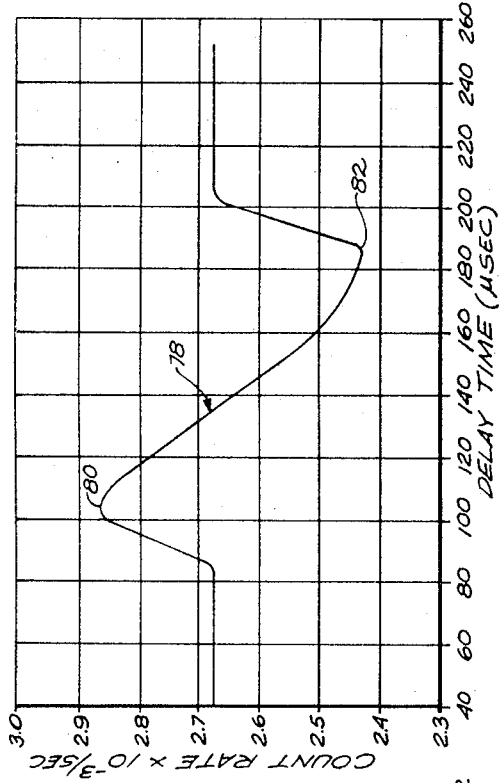
FIG. 13 is a graph of the time derivative of transducer response to a periodic nonsinusoidal driving force.

Referring now to the drawings in detail, FIG. 1 shows a schematic of the apparatus for carrying out the methods of the present invention and comprises a source 20 fixed to a source driving unit 22, a standard collimator 23, an absorber 24, and detector 25. The drive unit 22 is preferably a 500 kc. PZT-4 ceramic transducer to which the source 20 is attached. Other drive units which may be utilized include piezoelectric crystals for high frequency of loudspeakers which are particularly suited for low frequency, large amplitude measurements. The detector 25 is preferably composed of a 1 mm. thick x 1½" cleaved thallium activated sodium iodide crystal with a one mil Bé. window mounted on a standard photomultiplier tube. The source 20 is adapted to be moved back and forth along axis 26 by constant velocity mechanical drive unit 27, by which the standard Mossbauer effect curves of count rate as a function of known velocity are obtained. In the modification of the present invention the source 20 is mounted on a transducer unit 22 which is responsive to an electrical signal to induce a movement of the source 20 along the axis 26. The remaining components, i.e., collimator 23, absorber 24 and detector 25, are standard components positioned in the usual Mossbauer effect arrangement.

The transducer 22 is driven by a driving circuit which comprises a standard audio oscillator 28 connected to the transducer 22 and to the A.C. gate control system 29. The output of oscillator 28 is sinusoidal voltage as shown by curve 30 of FIG. 2. The displacement of the source 20 by the application of this voltage to the transducer 22 is directly proportional to the voltage of curve 30. The velocity profile of the source 20 is shown by curve 31 of FIG. 2.

The detector 25, responsive to the gamma-rays emitted by source 20, has its output, amplified by preamplifier 32 and amplifier 33, connected to a pulse height analyzer 34. The output of analyzer 34 is connected to scaler 35. The output of A.C. gate 29 is connected through contacts $b$–$c$ of switch 36 to scaler 35 and scaler 37. Both scalers 35 and 37 are provided with timers 38 and 39, however, neither timer is operative during A.C. gate operation. A time base generator 40 is connected through amplifier 41, and through contacts $b$–$c$ of switch 42 during A.C. gate operation to scaler 37 to obtain a time base count measure.

The detailed arrangement and operating sequence of A.C. gate control system 29 is shown in FIGS. 3 and 4. The A.C. input from oscillator 28 is fed to a standard Schmitt trigger 43 which generates a voltage level shift shown in FIG. 4($a$). This voltage level shift corresponds approximately to the zero crossing of curve 30, i.e., the point where the velocity (see FIG. 2) is a minimum (a negative maximum). This output is connected through flip flops 46 and 47 which generate the voltage level shifts shown in FIG. 4($b$) and ($c$) and which are A.C. coupled to multivibrator 48. The multivibrator 48 in response to the pulse (see FIG. 4($d$)) generates a voltage level shift the duration of which is controlled by variable delay capacitor 51. The output of multivibrator 48 is connected to inverter 49 which is A.C. coupled to the input of multivibrator 50. Multivibrator 50 generates a square wave output pulse the leading edge of which is controlled by the variable delay of multivibrator 48 and the trailing edge of which is variable in time in response to the preselected setting of capacitor 52 of the multivibrator 50. In this manner a gating pulse 53, which is generated a preselected time after the zero point of curve 30, i.e., a variable delay, and which has a preselected duration, i.e., variable width, is generated to control scalers 35 and 37 (see FIG. 1). The time scaler 37 also receives pulses from a time base generator 40 so that the total time during which the scaler 37 is actuated by gate pulse 53 may be accurately determined in terms of the number of timing pulses counted by scaler 37. Thus, the number of counts per unit of time received by scaler 35 through pulse height analyzer 34 may be accurately measured.

As is apparent from FIG. 4($i$) and curve 31, the count rate during a preselected interval of time, $t_1$, determined by the gate width, may be obtained and, by varying the delay after the zero point of curve 30, the counting time increment $t_1$ may be swept along the velocity curve 31 to obtain an average number of counts over the increment.

The above described apparatus may be utilized to perform two different methods for analyzing vibration. The first concerns the use of the apparatus to analyze transducer motion, and the second to calibrate transducers.

A cobalt-57 radioactive source 20 implanted in a palladium matrix in the form of a thin foil, ½″, in diameter by .002″ thick, was firmly attached to the vibrating transducer 22. The 14.4 kev. gamma-ray which exhibits Mossbauer behavior arises from the first excited state of iron-57, the daughter product of cobalt-57. When the absorber 24 is composed of unexcited iron-57 in palladium, full resonance absorption can occur, i.e., maximum absorption occurs for zero relative velocity between source and absorber, as shown in FIG. 5. If the absorbing iron-57 is diffused in stainless steel, partial resonance occurs, i.e., the ground state of the absorber is shifted with respect to the ground state of the source and the zero velocity count corresponds to some point intermediate to resonance absorption and nonresonance absorption, as shown in FIG. 6. If the absorbing iron is part of a compound, e.g., $FeSO_4 \cdot 7H_2O$ in which the iron nucleus resides in a local electric field, the excited state is split into two components. In this case two absorption maxima are found at proper relative velocities, i.e., quadrupole split resonance, as shown in FIG. 7. If the absorber is composed of row iron the nucleus is influenced by the presence of a local magnetic field thereby splitting the excited state into four components and the ground state into two components. This results in six resonance absorption lines which is called the Zeeman effect, as shown in FIG. 8. The method of analyzing transducer motion utilizes the partial resonance phenomena shown in FIG. 6 while the transducer calibration method utilizes the partial resonance, quadrupole splitting and Zeeman effect as shown in FIGS. 6, 7 and 8.

The absorbers utilized included SS–310, 1 and 0.15 mil thick; SS–316, 1 mil thick; SS–310 (enriched), 0.125 mil thick; $Fe_2SO_4 \cdot 7H_2O$ powdered crystallite, about 1 mm. thick; and Pd-Fe foil 0.85 mil thick. Examples of absorber characteristics are shown in table below.

TABLE

| Absorber | Abundance | Characteristic | Dip, percent | Shift (mm./sec.) | FWHM (mm./sec.) |
|---|---|---|---|---|---|
| SS–310 0.001″ | Natural (~1% $Fe^{57}$) | Unsplit | 14 | −0.26 | 0.46 |
| SS–310 0.000125″ | Enriched 91.2% $Fe^{57}$ | do | 44 | −0.25 | 0.66 |
| SS–316 0.001″ | Natural | do | 17 | −0.3 | 0.44 |
| Pd-Fe 0.00085″ | Natural 2% Fe (wt.) | do | 30 | 0 | 0.32 |
| $Fe^2SO^4 \cdot 7H^2O$ | Natural | Quadrupole split | 11.5 | −0.5 +2.65 | 0.34 QS 3.15 |

In table, FWHM is the full line width at half maximum dip, and shift refers to the displacement of the zero velocity point from maximum dip position. The dips are nominal and can be increased or decreased with a corresponding inverse gain or loss in count rate. The dips are given in terms of percent non-resonant count rate.

The above data is taken utilizing the conventional Mossbauer effect apparatus shown in FIG. 1 which includes the constant velocity drive unit 27 and constant velocity gate 43. The A.C. gate system is not utilized for these basic measurements. The constant velocity drive unit 27 is a conventional velocity drive capable of constant velocities in increments of 0.01 mm./sec. from 0.05 mm./sec. to 15 mm./sec. and is used in place of drive unit 22 to obtain spectral data on absorbers used in the methods of the present invention. The constant velocity gate 43 is used with drive unit 27 with switches 36 and 42 positioned to connect contacts $a$–$b$. The drive 27 translates the source toward (positive direction) the absorber along axis 26 and away (negative direction) at a constant velocity magnitude. This yields two data points on the spectral curve. The gate control 43 permits automatic scaler timer operation depending upon the sign of velocity. This gating operation and apparatus is standard and is utilized to obtain the Mossbauer spectrum curves shown in FIG. 5–8.

In analyzing transducer motion the A.C. gate method is used in conjunction with any Mossbauer absorber, but preferably with one exhibiting partial resonance. The radioactive source 20 is mounted on the oscillating element of drive unit 22 and the collimator 23 is used to directionally select gamma-rays emitted in the direction of peak displacement of the element. The gammas are resonantly absorbed by a Mossbauer absorber 24 and the amount of absorption in the direction of maximum velocity is observed.

The method of analyzing transducer motion comprises the following steps. The transducer 22 is driven sinusoidally by the oscillator 28, or other similar means, with the peak velocity limited to that part of the curve indicated by the arrow 60, i.e., that part of the partial resonance absorption curve of FIG. 6 bounded by the maximum absorption point and the zero absorption point. Since this portion of the curve is essentially linear the count rate in this region is approximately linear with velocity. The apparatus of FIG. 1 is utilized to sample the sinusoidal count rate at various points along this linear portion of the partial resonance curve. Thus, the scaler 35 is gated by pulse 53 a preselected time after the zero point of the voltage drive signal 30. This gating allows the scaler 35 to count for only the length of time the gate is open. Since the count rate in the gate interval is proportional to the source velocity, an instantaneous velocity analog is obtained. A new delay time is then selected so that a different portion of the curve is sampled and a new average velocity is measured in terms of count rate. This process is repeated until the full period of the transducer motion has been investigated. The gate generates a scaler-gate pulse of variable length and at a variable delay from every fourth zero crossing with the positive slope of the drive signal, allowing a large statistical count to be accumulated by counting for extended periods of time.

In order to measure the frequency of the applied signal a constant peak voltage is imposed on the transducer and count rate data as a function of delay is obtained. The count rate will be periodic in time and the period of motion may be determined. The plot of count rate against delay time for a sinusoidal input will be approximately cosinusoidal in shape. The degree of approximation depends upon the linearity of count rate versus velocity data over the portion 60 of the curve utilized. Thus, the period of the motion may be measured unambiguously from the restricted range used and velocity amplitude may be determined by reference to the count rate versus velocity calibrated curve taken with the constant velocity drive unit.

The degree of velocity measurement accuracy depends, of course, on the ratio of gate length to the period of motion, since a comparison of average to instantaneous velocity is being made. The ratio of average to instantaneous velocity can be readily determined by standard mathematical analysis. As an example of the magnitude of the correction necessary, a gate length of 10 percent of the period of motion yields an average velocity of about 98.6 percent peak while 50 percent of the period yields 63 percent of peak. The practical limits on gate length are set by two factors, data acquisition time and scaler gating ability. With the apparatus of the preferred embodiment a 10 $\mu$sec. gate is a reasonable choice since it yields an upper limit on a 10 percent period gate of a 10 kc. driving frequency.

As the rate of gate length to period decreases below 10 percent the need for a correction factor rapidly disappears but data acquisition time correspondingly increases. However, data acquisition time can be reduced by increasing source strength and utilizing close geometry.

Utilizing the above described A.C. gate apparatus the following example illustrates the method of analyzing transducer motion.

METHOD I

Figure 11:
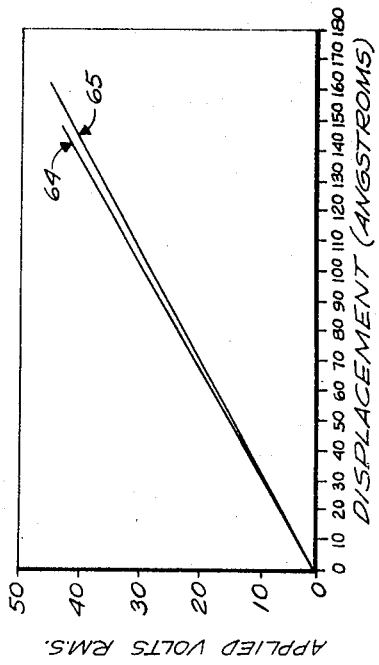
FIG. 11 is a graph of applied voltage as a function of displacement.

The driving voltages to unit 22 were controlled to limit peak velocities to the region of the spectral curve bounded by the minimum transmission point, i.e., to the linear portion 60 (FIG. 6) of the curve. With an SS–310 absorber and a PZT–4 transducer having a rated sensitivity of 2.55 A. volt (RMS) the transducer was driven with an audio oscillator of 2 kc., 5 kc. and 10 kc. Gate length in each test was 50 $\mu$sec. and at 2 kc. successive delays of 50 $\mu$sec. multiples fixed the average count rate point at a delay-plus-½-gate-length position. The first data point on the 2 kc. data curve 61 (see FIG. 9) was taken at a delay of 10 $\mu$sec., gate width 50 $\mu$sec., and therefore falls at 35 $\mu$sec. from drive signal zero. FIG. 9 which shows resonant to nonresonant count ratio as a function of delay time from drive signal zero, illustrates, at curve 61, the count rate data for a 35.05 v. (RMS) driving voltage. Since the count rate, by the selection of a portion 60 of a partial resonance curve, is linearly related to velocity, the count rate can be interpreted in terms of velocity as a function of delay time, as shown in FIG. 10. Curve 62 is the data of curve 61 translated to velocity and represents the 35.05 v. (RMS) driving voltage case. Curve 63 shows the effect of decreasing the driving voltage to 25 v. (RMS) while holding the frequency constant. Similar data for 10 kc. and 5 kc. were obtained, except that delays of 10 $\mu$sec. multiples were used. Since the velocity is equal to the product of the frequency and displacement, the transducer can be calibrated in terms of displacement as a function of applied voltage (RMS). FIG. 11 shows the experimentally determined peak displacement curve 64 and the theoretical peak displacement curve 65 for a PZT–4 transducer. Thus, by utilizing this method the displacement versus applied voltage characteristics of a transducer can be accurately determined.

METHOD II

The second method of the present invention is one for for calibrating small amplitude transducers, e.g., electromagnetic, ferroelectric and piezoelectric. The method utilizes the velocity positions of absorption maxima on Mossbauer absorbers exhibiting various shift and internal field splitting phenomena as shown in FIGS. 5–8. The method is as follows. The Mossbauer source 20 is mounted on a loudspeaker of known characteristics as the transducer 22 to be calibrated and an absorber 24, e.g., SS–316, is employed in the usual wave tracing fashion. A frequency of 8 kc. was used with a gate of 10 $\mu$sec. The maximum velocity of the transducer under sinusoidal motion is limited to the linear range of the absorber and at a constant maximum velocity the motion of the transducer is plotted. This is accomplished by incremental scaler gating triggered by the transducer drive signal as discussed above. The scaler gate is preferably fixed at 10 percent or less of the motion period. The delay of the scaler gate is adjusted so that counting occurs only when the velocity is maximum positive and negative, corresponding to maximum and minimum count on the SS–316 absorber. For the first calibration point the scaler gate is opened on the negative velocity peak and the transducer excitation is increased until a minimum count is reached. The point 66 (see FIG. 6) corresponds to maximum partial resonance absorption on the SS–316 absorber. Since the velocity of this point is known from a linear calibration, a single point calibration for the transducer has been obtained in terms of mm. sec. volt.

The absorber is removed, and an absorber exhibiting quadrupole split resonance, e.g., FeSO$_4$·7H$_2$O is used (see FIG. 1). The scaler gate delay is still fixed on the negative velocity drive peak, and transducer excitation is again increased until a count minimum is obtained. This point 67 corresponds to the negative velocity absorption line on the quadrupole absorber. The scaler gate delay is now changed to the positive velocity drive peak 68 and the excitation is varied until the positive absorption line is found. Three calibration points have now been obtained. By substituting a Zeeman split absorber Fe (enriched) (see FIG. 8), six more calibration points 69–74 are available. Since the resonance absorption case (see FIG. 5) has a maximum count at zero velocity the calibration curve of FIG. 12 passes through the origin.

Figure 12:
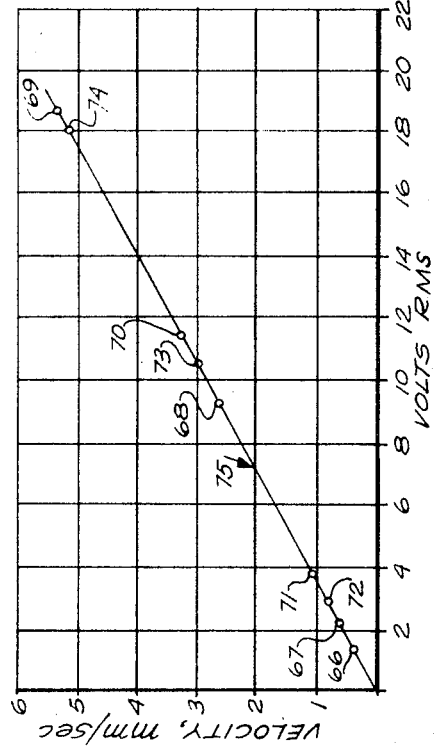
FIG. 12 is a graph of absolute velocity as a function of driving force showing the calibration of a transducer.

An example of the results of the above method is shown in FIG. 12 where the absolute velocity in mm./sec. is plotted as a function of the driving voltage. From the curve 75 it is clear that the transducer has a linear relation between velocity and driving voltage. Since the voltage is equal to the angular frequency times the amplitude, it can readily be determined that the calibration of this particular transducer is 56.4 A./volt (RMS).

The above described methods may also be utilized to analyze transducer vibration or to calibrate transducers in response to periodic non-sinusoidal driving voltages. Thus, a 5 kc. half-wave rectifier signal, 17 volts peak, was applied to a PZT–5 crystal transducer on which the source 20 was mounted and the variable delay A.C. gate method was used to analyze transducer motion. An SS–310 nonenriched absorber and a gate of 20 μ sec. were used. FIG. 13 shows the curve obtained with this driving voltage. The curve 78 is of transducer transient response and agrees in shape with what would be expected from this type of driving voltage. Gating was initiated from the unrectified signal. The high count rate peak 80 is smaller than the low count rate peak 82 because of nonlinearity in the region of increased positive velocity on the SS–310 absorber. A peak displacement amplitude of approximately 55 A. was obtained.

The present invention is not limited to the specific details of the particular embodiments described, since many modifications will be apparent to those skilled in the art, the scope of the present invention being limited only by the appended claims.

I claim:

1. Apparatus for analyzing the vibrational characteristics of a member comprising a known Mossbauer source fixed directly to said member, means for driving said member to vibrate with a periodic motion of preselected frequency, radiation detector means for counting the radiation emitted from said source, Mossbauer absorber means positioned between said source and said detector means, gate means for generating a time increment gating pulse having a preselected and variable width, said gating means being responsive to said driving means and including means for selectively varying the time delay between the time of a preselected point of said periodic motion and the initiation of said gating pulse, scaler means responsive to said detection means and said gating pulse for counting the radiation emitted by said source during said gating pulse whereby the average velocity of said member during the time of said pulse is measured and the displacement corresponding to that velocity may be determined.

2. The apparatus of claim 1 wherein said scaler means includes a second scaler responsive to said gating pulse and to time base generator means so that the time equivalent of the gate pulse width is measured.

3. The apparatus of claim 1 wherein said gate means includes a first and second multivibrator means, said multivibrator means having means connected thereto for selectively varying the initiation and duration of said gating pulse.

4. The apparatus of claim 1 wherein said means for vibrating includes a source of sinusoidal driving voltage.

5. The apparatus of claim 1 wherein said driving means includes an oscillator and said gating means includes for generating a signal when said oscillator signal is at a preselected point.

6. The apparatus of claim 1 wherein said Mossbauer absorber is a partial resonance absorber.

7. A method for analyzing the vibrating motion of a transducer comprising the steps of selecting a region on a known transmission spectra of count rate versus source velocity which is essentially linear, vibrating a transducer having a known Mossbauer source directly attached thereto at a preselected frequency, counting the radiation from said source which passes through a Mossbauer absorber during a first time interval corresponding to a first known source velocity in said linear region, said absorber exhibiting said known Mossbauer transmission spectra, counting the radiation passing through a Mossbauer absorber during a second time interval corresponding to a second known source velocity, and repeating said counting step for a plurality of known source velocities along said selected region so that the peak amplitude for the transducer in response to said vibration may be measured.

8. The method of claim 7 wherein said vibrating step includes vibrating said transducer at a plurality of discrete frequecies.

9. The method of claim 7 wherein said Mossbauer absorber is a partial resonance absorber.

10. A method of calibrating transducers comprising the steps of vibrating a transducer with a driving force, said transducer having a known Mossbauer source directly attached thereto, counting the radiation from said source after it has passed through a Mossbauer absorber having a first known transmission spectrum, said count being taken at a point on the Mossbauer transmission spectrum where the count is a minimum, and repeating said counting step at at least one other point where the count is minimum with at least one other absorber having a known Mossbauer effect transmission spectrum different from said first spectrum, said points defining a curve showing the displacement response of said transducer to said driving force.

11. The method of claim 10 wherein one of said absorbers is a partial resonance absorber.

12. The method of claim 10 wherein one of said absorbers is a quadrupole split resonance absorber.

13. The method of claim 10 wherein one of said absorbers is a nuclear Zeeman effect absorber.

References Cited

UNITED STATES PATENTS

| | | | |
|---|---|---|---|
| 3,146,624 | 9/1964 | Talbot | 250—108 X |
| 3,257,558 | 6/1966 | Cook et al. | 250—84 X |

ARCHIE R. BORCHELT, *Primary Examiner.*

U.S. Cl. X.R.

250—84

PO-1050
(5/69)

UNITED STATES PATENT OFFICE
CERTIFICATE OF CORRECTION

Patent No. 3,454,766          Dated July 8, 1969

Inventor(s)  N. A. Roughton

It is certified that error appears in the above-identified patent and that said Letters Patent are hereby corrected as shown below:

Column 1, line 19, add the following paragraph:

-- The invention described herein was made in the performance of work under a NASA contract and is subject to the provisions of Section 305 of the National Aeronautics and Space Act of 1958, Public Law 85-568 (72 Stat. 435; 42 USC 2457.)--

SIGNED AND
SEALED
MAY 19 1970

(SEAL)
Attest:

Edward M. Fletcher, Jr.
Attesting Officer

WILLIAM E. SCHUYLER, JR.
Commissioner of Patents